(12) United States Patent
Glasmacher

(10) Patent No.: US 8,916,059 B2
(45) Date of Patent: Dec. 23, 2014

(54) FLUORINATED KETONES AS HIGH-VOLTAGE INSULATING MEDIUM

(75) Inventor: Peter Glasmacher, Korschenbroich (DE)

(73) Assignee: ABB Technology AG (CH)

( * ) Notice: Subject to any disclaimer, the term of this patent is extended or adjusted under 35 U.S.C. 154(b) by 141 days.

(21) Appl. No.: 13/330,430

(22) Filed: Dec. 19, 2011

(65) Prior Publication Data

US 2012/0145521 A1   Jun. 14, 2012

Related U.S. Application Data

(63) Continuation of application No. PCT/EP2010/058317, filed on Jun. 14, 2010.

(30) Foreign Application Priority Data

Jun. 17, 2009   (DE) .......................... 10 2009 025 204

(51) Int. Cl.
*C09K 13/00* (2006.01)
*H02B 13/055* (2006.01)
*H01H 31/00* (2006.01)
*H01H 33/56* (2006.01)

(52) U.S. Cl.
CPC ............ *H02B 13/055* (2013.01); *H01H 31/003* (2013.01); *H01H 2033/566* (2013.01)
USPC .............................................. 252/67; 252/68

(58) Field of Classification Search
None
See application file for complete search history.

(56) References Cited

U.S. PATENT DOCUMENTS

| | | |
|---|---|---|
| 3,150,245 A | 9/1964 | Leeds et al. |
| 3,185,734 A | 5/1965 | Fawcett et al. |
| 3,201,728 A | 8/1965 | McWhirter |
| 4,071,461 A | 1/1978 | Mears et al. |
| 4,136,121 A | 1/1979 | Martini et al. |
| 4,162,227 A | 7/1979 | Cooke |
| 4,166,798 A | 9/1979 | Mastroianni et al. |
| 4,175,048 A | 11/1979 | Christophorou et al. |
| 4,288,651 A | 9/1981 | Wootton |
| 4,296,003 A | 10/1981 | Harrold et al. |
| 4,350,838 A | 9/1982 | Harrold |
| 4,440,971 A | 4/1984 | Harrold |
| 5,399,718 A | 3/1995 | Costello et al. |
| 5,466,877 A | 11/1995 | Moore |
| 5,730,894 A | 3/1998 | Minor |
| 5,858,065 A | 1/1999 | Li et al. |

(Continued)

FOREIGN PATENT DOCUMENTS

| | | |
|---|---|---|
| CA | 2420574 C | 3/2002 |
| CA | 2516996 C | 9/2004 |

(Continued)

OTHER PUBLICATIONS

International Preliminary Report on Patentability; Application No. PCT/EP2010/058317; Issued: Sep. 21, 2011; 10 pages.

(Continued)

*Primary Examiner* — Necholus Ogden, Jr.
(74) *Attorney, Agent, or Firm* — St. Onge Steward Johnston & Reens LLC

(57) ABSTRACT

A switching device for medium, high, or extremely high voltage, wherein at least one voltaged component of the switching device is enclosed in an enclosure and the enclosure is filled with a filling medium. The filling medium includes at least one compound from the group of fluorinated ketones, or consists of the same.

38 Claims, 2 Drawing Sheets

(56) References Cited

U.S. PATENT DOCUMENTS

| | | |
|---|---|---|
| 5,998,671 A | 12/1999 | Van Der Puy |
| 6,276,190 B1 | 8/2001 | Zamfes |
| 6,394,107 B1 | 5/2002 | Kesari et al. |
| 6,403,149 B1 | 6/2002 | Parent et al. |
| 6,478,979 B1 | 11/2002 | Rivers et al. |
| 7,074,343 B2 | 7/2006 | Minor et al. |
| 7,128,133 B2 | 10/2006 | Costello et al. |
| 7,184,895 B2 | 2/2007 | Chetay et al. |
| 7,314,576 B2 | 1/2008 | Minor et al. |
| 7,390,427 B2 | 6/2008 | Costello et al. |
| 7,416,679 B2 | 8/2008 | Minor et al. |
| 7,736,529 B2 | 6/2010 | Luly et al. |
| 7,742,283 B2 | 6/2010 | Hama et al. |
| 7,816,618 B2 | 10/2010 | Uchii |
| 7,923,630 B2 | 4/2011 | Richardson |
| 8,080,185 B2 | 12/2011 | Luly et al. |
| 8,245,512 B2 | 8/2012 | Schwiegel et al. |
| 2002/0095262 A1 | 7/2002 | Chetay et al. |
| 2003/0007543 A1 | 1/2003 | Grenfell et al. |
| 2004/0056234 A1 | 3/2004 | Belt et al. |
| 2004/0197474 A1 | 10/2004 | Vrtis et al. |
| 2005/0127322 A1 | 6/2005 | Costello et al. |
| 2006/0210711 A1 | 9/2006 | Hayashi et al. |
| 2007/0221626 A1 | 9/2007 | Uchii |
| 2008/0135817 A1 | 6/2008 | Luly et al. |
| 2009/0078680 A1 | 3/2009 | Franck et al. |
| 2009/0095717 A1 | 4/2009 | Luly et al. |
| 2009/0109604 A1 | 4/2009 | Yanabu et al. |
| 2011/0192821 A1 | 8/2011 | Dufournet |
| 2011/0232870 A1 | 9/2011 | Flynn et al. |
| 2012/0085735 A1 | 4/2012 | Uchii et al. |
| 2012/0145521 A1 | 6/2012 | Glasmacher |
| 2012/0152904 A1 | 6/2012 | Hyrenbach et al. |

FOREIGN PATENT DOCUMENTS

| | | |
|---|---|---|
| CN | 101197221 A | 6/2008 |
| DE | 548450 C | 6/1934 |
| DE | 598450 C | 6/1934 |
| DE | 641963 C | 2/1937 |
| DE | 3215234 A1 | 10/1983 |
| DE | 19519301 A1 | 11/1996 |
| DE | 202009009305 U1 | 11/2009 |
| DE | 102009025204 C5 | 1/2013 |
| EP | 0131922 A1 | 1/1985 |
| EP | 0545430 A1 | 6/1993 |
| EP | 0670294 B1 | 9/1995 |
| EP | 1085365 A2 | 3/2001 |
| EP | 1132746 A2 | 9/2001 |
| EP | 1146522 A1 | 10/2001 |
| EP | 1221612 A1 | 7/2002 |
| EP | 1261398 B1 | 12/2002 |
| EP | 1498941 A2 | 1/2005 |
| EP | 1764487 A1 | 3/2007 |
| EP | 1933432 A1 | 6/2008 |
| EP | 2525454 A2 | 11/2012 |
| FR | 2930019 A1 | 10/2009 |
| FR | 2955970 A1 | 8/2011 |
| GB | 753375 A | 7/1956 |
| GB | 1194431 A | 6/1970 |
| JP | 8306549 A | 11/1996 |
| JP | 2738997 B2 | 4/1998 |
| JP | 2879848 B1 | 4/1999 |
| JP | 11286679 A | 10/1999 |
| JP | 2000059935 A | 2/2000 |
| JP | 2000224722 A | 8/2000 |
| JP | 2001086611 A | 3/2001 |
| JP | 2005126480 A | 5/2005 |
| JP | 2007300716 A | 11/2007 |
| JP | 2010021263 A | 1/2010 |
| JP | 2010131584 A | 6/2010 |
| JP | 2010171173 A | 8/2010 |
| KR | 20070080895 A | 8/2007 |
| RU | 2276164 C2 | 5/2006 |
| WO | 0024814 A1 | 5/2000 |
| WO | 0105468 A2 | 1/2001 |
| WO | 0250173 A2 | 6/2002 |
| WO | 02086191 A1 | 10/2002 |
| WO | 02086192 A1 | 10/2002 |
| WO | 02103319 A1 | 12/2002 |
| WO | 03022981 A1 | 3/2003 |
| WO | 2004090177 A1 | 10/2004 |
| WO | 2007013169 A1 | 2/2007 |
| WO | 2007075804 A1 | 7/2007 |
| WO | 2007136948 A2 | 11/2007 |
| WO | 2008073790 A2 | 6/2008 |
| WO | 2010108934 A1 | 9/2010 |
| WO | 2010142346 A1 | 12/2010 |
| WO | 2010146022 A1 | 12/2010 |
| WO | 2011019456 A1 | 2/2011 |
| WO | 2011054870 A1 | 5/2011 |
| WO | 2011090992 A1 | 7/2011 |
| WO | 2011119421 A1 | 9/2011 |
| WO | 2011119456 A1 | 9/2011 |
| WO | 2012038442 A1 | 3/2012 |
| WO | 2012038443 A1 | 3/2012 |

OTHER PUBLICATIONS

Internaitonal Search Report and Written Opinion of the International Searching Authority; Application No. PCT/EP2010/058317; Issued: Nov. 30, 2010; Mailing Date: Dec. 7, 2010; 6 pages.

Smith, et al.; "Perfluoroisopropyl Ketones—The Chemistry of Carbonyl Fluoride. II. Synthesis of Perfluoroisopropyl Ketones"; Journal of the American Chemical Society (J. Am. Chem. Soc.), vol. 84, pp. 4285-4288, 1962.

3M(tm) Novec(tm) 1230 Fire Protection Fluid—Brochure © 3M 2008; 6 pages.

3M(tm) Flüssigkeiten für das Wärmemanagement und Elektro-/Elektronik-Testen—Brochure © 3M 2010; 8 pages.

Yamamoto et al, "Applying a Gas Mixture Containing c-C4F8 as an Insulation Medium", IEEE Transactions on Dielectrics and electrical Insulation, vol. 8 No. 6, Dec. 2001 (abstract only—2 pages).

Cartwright, et al.; "Barrow Offshore Windfarm Design & Build of UKs First OWF Sub-Station"; Vestas KBR; Oct. 2005; 26 pages.

Kynast, et al.; "Basic investigations concerning equipment with liquefied SF6 under extreme low temperatures"; Technical Colloquium; 2011; 8 pages.

Milbrath; "Development of 3MTM NovecTM 612 Magnesium Protection Fluid as a Substitute for SF6 over Molten Magnesium"; Presented at the International Conference on SF6 and the Environment, Nov. 21-22, 2002.

Seimens Alarm Brochure—2005; 40 pages.

Abb, et al.; "Valhall Re-Development Project, Power From Shore"; Mar. 17, 2010; 5 pages.

Anonymous: "CBWatch-2 Modular Circuit Breaker Monitoring System"; Alstom Product Brochure; Sep. 1, 2010; 4 pages.

Niemeyer, Lutz. "CIGRE Guide for SF6 gas mixtures. Application and Handling in electric power Equipment." ABB Corp Research Cetre; 2000; 8 pages.

Hillers, et al.; "Control, Monitoring and Diagnostics for High Voltage GIS"; IEE Colloquim on GIC (Gas-Insulated Switchgear); Nov. 14, 1995; pp. 6/1-6/4.

Brand, "Dielectric Strength, Boiling Point and Toxicity of Gases—Different Aspects of the Same Basic Molecular Properties"; Oct. 1982; pp. 451-456.

3M(tm); "Fluorochemicals in Heat Transfer Applications"; Jun. 21, 2000; 27 pages.

Tuma, "Fluoroketone C2F5C(O)CF(CF3)2 as a Heat Transfer Fluid for Passive and Pumped 2-Phase Applications"; 24th IEEE Semi0Therm Symposium; 2008; 8 pages.

Christophorou, et al.; "Gases for electrical insulation and arc interruption : possible present and future alternatives to pure SF6"; NIST Technical Note 1425; Nov. 1997; 48 pages.

FLUORINATED KETONES AS HIGH-VOLTAGE INSULATING MEDIUM

CROSS-REFERENCE TO RELATED APPLICATIONS

The present application is a continuation of pending International Patent Application PCT/EP2010/058317 filed on Jun. 14, 2010 which designates the United States and claims priority from German Patent Application 10 2009 025 204.5 filed on Jun. 17, 2009, the content of which is incorporated herein by reference.

FIELD OF THE INVENTION

The invention concerns a switching device for medium, high or extremely high voltage, wherein at least one voltaged component of the switching device is enclosed in an enclosure, and the enclosure is filled, or can be filled, with a filling medium.

BACKGROUND OF THE INVENTION

All the components that are voltaged in at least one operating state of the switching device can be understood to be voltaged components. However, they need not actually be voltaged in every operating state of the switching device. Depending upon its setting, for example, a switch is not always voltaged, even though by means of a switching process it can be translated into an operating state in which it is voltaged.

Depending upon the definitions used the demarcations of the regions of medium, high or extremely high voltage can vary. According to one prevalent definition, the medium voltage region extends from 1 kV to 52 kV and the high-voltage region from 52 kV to 110 kV. According to another definition the high-voltage region starts earlier at 50 kV. Voltages greater than 110 kV are designated as extremely high voltages. Accordingly a switching device for medium, high or extremely high voltage can be understood to be a switching device for voltages from 1 kV upwards.

Switchgear and switching equipment for medium, high or extremely high-voltage are also included amongst these switching devices. A multiplicity of switching devices of this type are of known prior art.

An exemplary item of switching equipment for medium, high or extremely high voltage is a switch for voltages such as are also used, for example, in switchgear for medium, high or extremely high voltage. Switchgear of this type allow, by means of appropriate switching the formation of connections between different conductors, and thus, for example, the supply of energy to various consumers, or the reaction to failures of particular conducting paths, in that these are bridged by the selection of alternative energy supply paths.

Switching devices for medium, high or extremely high voltage must often satisfy high requirements with respect to their reliability and human safety. These include, for example, in switches for medium, high or extremely high-voltage, such as power switches, power disconnectors, load switches, circuit breakers, load disconnectors, etc., the requirement that arcs occurring between the contacts during the switching processes can be rapidly extinguished, or that their occurrence can be prevented. To satisfy these requirements various solutions have been proposed in the past. Thus switches for medium, high or extremely high voltages can be assigned extinguishing coils that have the task of extinguishing switching arcs. Likewise voltaged components of switching devices for medium, high or extremely high voltage can be enclosed in an enclosure that is filled with a filling medium. As an example it should be stated here that the contacts of switches for medium, high or extremely high voltage are often enclosed in an enclosure that is filled with a filling medium. The filling medium can have the property of rapidly extinguishing any arcs that occur, i.e. it can act as an arc extinguishing medium.

Voltaged components of switchgear for medium, high or extremely high voltage, for example, busbars, can be enclosed in an enclosure that can, for example, be designed as a separate chamber or bulkhead compartment in the housing of the switchgear. A suitable filling medium with which this enclosure is filled can act as an electrical insulation medium and can insulate voltaged components from other components of the switchgear. Equally it can act as an arc extinguishing medium for any fault arcs that may occur within the switchgear. The personal safety of operators of the switchgear can be increased both by means of an electrical insulation action of a filling medium and also by means of a fault arc extinguishing action of a filling medium. If fault arcs are extinguished promptly after they appear down times and maintenance requirements can be reduced. Instead of filling with a filling medium a vacuum is also often generated in the enclosure of switching devices for medium, high or extremely high voltage.

Air, oil and a "solid gas", i.e. a material that translates into a gaseous state only when the arc develops can be named as filling media, amongst others. DE 598 450 A discloses a circuit breaker. The breaker contacts of the circuit breaker are accommodated in containers filled with oil. From DE 641 963 A a metal-clad electrical switchgear is of known art, in which components such as a power switch and a transformer are accommodated in a vessel filled with oil as an insulation fluid.

However, sulphur hexafluoride (SF6) is also often used as a filling medium that is suitable both as an arc extinguishing medium and also as an electrical insulation medium. In comparison to air SF6 offers the advantage of a higher breakdown resistance by a factor of approximately 2.5 at standard pressure. This makes possible small insulation separation distances, and thus allows the design of more compact switching devices for medium, high or extremely high-voltage. From DE 195 19 301 A1 a breaker for a metal-enclosed gas-insulated high-voltage switchgear is of known art. Here a contact pin and an opposing contact are arranged in a housing that is filled with SF6 as an insulation gas. DE 32 15 234 C2 describes enclosed medium voltage switchgear, in which switching blades are arranged in a housing filled with an insulation gas; the blades can be brought into three switching positions.

From the point of view of environmental protection, and in particular climate protection, however, SF6 is beset with many disadvantages. Its global warming potential (GWP), also known as its CO2-equivalent, is 22,800. Thus 1 kg of SF6 over a time period of 100 years is considered to be just as damaging as 22,800 kg of CO2. Moreover its atmospheric lifespan is extremely high at 3200 years. Thus in Europe, for example, the handling and use of SF6 is subject to stringent regulations. Stocks of SF6 and its consumption must be monitored, for example.

SUMMARY OF THE INVENTION

It is therefore an object of the invention to provide switching devices for medium, high or extremely high voltage, which are distinguished by good insulation of voltaged components, reliable extinction of any arcs that may occur, and good environmental compatibility.

This object is achieved by means of a switching device for medium, high or extremely high voltage, wherein at least one voltaged component of the switching device is enclosed in an enclosure, and the enclosure is filled with a filling medium that contains at least one compound from the group of fluorinated ketones, or consists of the same. Furthermore this object is achieved by the use of at least one compound from the group of fluorinated ketones as a constituent of a filling medium, or as a filling medium, for the filling of an enclosure, in which at least one voltaged component of a switching device for medium, high, or extremely high voltage is enclosed, and also by a method for the filling of an enclosure, in which at least one voltaged component of a switching device for medium, high, or extremely high voltage is enclosed, with a filling medium that contains at least one compound from the group of fluorinated ketones, or consists of the same.

Here it is not a prerequisite of the invention that the filling of the enclosure with the filling medium is complete. In fact the invention comprises also such variants in which the volume of the filling medium is less than the volume bounded by the enclosure.

Partially fluorinated or perfluorinated ketones with the general formula R—C(0)-R' can be used, for example, as fluorinated ketones, wherein R and R' are partially fluorinated or perfluorinated substituents, which can be the same, or can differ, and are, for example, fluorinated alkyl groups. R can, however, also stand for a linear or branched alkyl group. The fluorinated alkyl groups can likewise be linear or branched. R can for example stand for a perfluorisopropyl group and R' for a trifluormethyl group or a pentafluorethyl group.

As just one example of a partially fluorinated ketone a compound with the above-cited general formula can be cited, in which R stands for a linear or branched alkyl group, for a methyl group, for example, and R' has the meaning cited above.

Particular compounds from the group of fluorinated ketones are, to name just a few examples, CF3C(O)CF(CF3)2, CF3CF2C(O)CF(CF3)2, CH3C(O)CF2CF2H and CH3C(O)CF2CFHCF3.

The manufacture of these fluorinated ketones is described in EP 1 261 398.

Fluorinated ketones can be manufactured using methods of known art. For example, they can be manufactured by the dissociation of perfluorinated carboxylic acid esters using the conversion of the perfluorinated ester with a fluoride ion source under reaction conditions, as is described in the U.S. Pat. No. 5,466,877 (Moore et al.), and by the combination of the ester with at least one initiator, which is selected from the group consisting of gaseous, non-hydroxylated nucleophiles; liquid, non-hydroxylated nucleophiles, and mixtures of at least one non-hydroxylated nucleophile (gaseous, liquid, or solid) and at least one solvent, which is inert with respect to acylating agents. The fluorinated carboxylic acid ester precursors can be derived from the corresponding fluorine-free or partially fluorinated hydrocarbon esters by means of direct fluorination with fluorine gas, as is described in the U.S. Pat. No. 5,399,718 (Costello et al.).

Fluorinated ketones, which are alpha-branched to the carbonyl group, can be manufactured as, for example, described in US patent specification U.S. Pat. No. 3,185,734 (Fawcett et al.) and in the Journal of the American Chemical Society (J. Am. Chem. Soc.), volume 84, pages 4285-88, 1962. These branched fluorinated ketones are most advantageously manufactured by the addition of hexafluoropropylene to acyl halogenides in a water-free environment in the presence of fluoride ions at an elevated temperature, as a rule approximately 50 to 80° C. The diglyme/fluoride ion mixture can be recycled for subsequent preparations of fluorinated ketones, e.g. to minimise the exposure to moisture. If this reaction scheme is used, a small quantity of hexafluoropropylene dimer and/or trimer can be present in the branched perfluorinated ketone product as a by-product. The quantity of dimer and/or trimer can be minimised by the stepwise addition of hexafluoropropylene to the acyl halogenide over an extended period of time, e.g. several hours. These dimer and/or trimer contaminations can normally be removed by distillation from the perfluorinated ketone. In cases in which the boiling points lie too close to one another for fractional distillation, the dimer and/or trimer contamination can advantageously be removed in an oxidative manner by treatment of the reaction product with a mixture of an alkali metal permanganate in a suitable organic solvent such as acetone, acetic acid, or a mixture of these, at ambient temperature or an elevated temperature, preferably in a sealed vessel.

Acetic acid is a preferred solvent for this purpose; it has been observed that acetic acid does not tend to decompose the ketone, whereas in some cases a certain level of decomposition has been detected if acetone has been used. The oxidation reaction is preferably executed at an elevated temperature, i.e. above room temperature, preferably approximately 40° C. or higher, in order to accelerate the reaction. The reaction can be executed under pressure, in particular if the ketone has a low boiling point.

The reaction is preferably executed with agitation so as to assist complete mixing of the two phases, which possibly may not be completely miscible.

If in the hexafluoropropylene additive reaction relatively volatile, short chain acyl halogenides (e.g. acyl halogenides containing from two to about five carbon atoms) are used, a significant build-up of pressure can occur in the reactor at elevated reaction temperatures (e.g. at temperatures in the range from about 50° C. to about 80° C.). It has been discovered that this build-up of pressure can be minimised if initially only a fraction of the acyl halogenide feed material (e.g. some 5 to 30 percent) is added to the reactor and the remaining component of the acyl halogenide is fed in, together with the hexafluoropropylene, continuously or in small steps (preferably in an equimolar ratio) over an extended period of time (e.g. 1 to 24 hours, in part dependent on the size of the reactor). The initial acyl halogenide feed material and the subsequent supply of the two constituents together to the reactor also serve to minimise the production of the hexafluoropropylene dimer and/or trimer by-products. The acyl halogenide is preferably an acyl fluoride and can be perfluorinated (e.g. CF3C0F, C2F6C0F, C3F7C0F), partially perfluorinated (e.g. HCF2CF2C0F), or not fluorinated (e.g. C2H5C0F), wherein the ketone product formed is perfluorinated or partially fluorinated. The perfluoroketones can also include constituents that contain one or more non-chain forming heteroatoms interrupting the main carbon chain in the perfluorinated part of the molecule, such as, for example a nitrogen, oxygen or sulphur atom.

Perfluorinated ketones, which can be linear, can be manufactured according to the teaching of U.S. Pat. No. 4,136,121 (Martini et al.) by the conversion of an alkali metal salt of the perfluorinated carbonic acid with a perfluorinated acyl fluoride. Ketones of this type can also be manufactured according to the teaching of U.S. Pat. No. 5,998,671 (Van Der Puy) by the conversion of a salt of the perfluorinated carbonic acid with a perfluorinated acid anhydride in an aprotic solvent at elevated temperatures.

The filling medium can either contain at least one compound from the group of fluorinated ketones, or it can consist of at least one compound of the group of fluorinated ketones. In the first case in addition to the at least one compound from the group of fluorinated ketones, other components that do not belong to the group of fluorinated ketones are a constituent of the filling medium. The at least one compound from the group of fluorinated ketones is therefore itself also only one constituent of the filling medium. In the second case the filling medium contains exclusively one or a plurality of compounds from the group of fluorinated ketones, there are therefore no constituents of the filling medium present that do not belong to the group of fluorinated ketones.

Exemplary forms of embodiment of the present invention provide that the compound from the group of fluorinated ketones is a compound from the C3-C15 group of fluorinated ketones, in particular of the C4-C8 group of fluorinated ketones, preferably of the C5-C7 group.

In accordance with forms of embodiment of this type, and other forms of embodiment, provision can be made that the compound from the group of fluorinated ketones is a compound from the group of perfluorinated ketones.

Here an example of embodiment of the invention provides that the compound is from the group of the perfluorinated ketones $CF_3CF_2C(O)CF(CF_3)_2$, i.e. dodecafluorine-2-methyl pentane-3-on. This can be of advantage, amongst others, for the reason that this compound can be obtained commercially under the brand name Novec 1230. It need not therefore be especially manufactured for the use according to the invention; rather it is already available. Up to the present time $CF_3CF_2C(O)CF(CF_3)_2$ has been used as a fire extinguishing medium of known art.

In what follows properties of compounds from the group of fluorinated ketones, and possible advantages that can accompany the use according to the invention of a compound from the group of fluorinated ketones as a constituent of a filling medium, or as a filling medium, for the filling of an enclosure, in which at least one voltaged component of a switching device for medium, high or extremely high voltage is enclosed, are elucidated and described in concrete terms for a filling medium in which the compound is from the group of fluorinated ketones $CF_3CF_2C(O)CF(CF_3)_2$.

Compounds from the group of fluorinated ketones can be distinguished by comparatively good environmental compatibility, in particular from the point of view of climate protection. For $CF_3CF_2C(O)CF(CF_3)_2$, for example, the global warming potential (GWP) of 1.1 kg of $CF_3CF_2C(O)CF(CF_3)_2$ is thus, considered over a period of time of 100 years, as damaging as just 1 kg of $CO_2$. Its atmospheric lifespan is only 5 days (0.014 years), and is therefore many times less than SF6, for example. Its ozone depletion potential (ODP) is 0.

Furthermore compounds from the group of fluorinated ketones can offer the advantage of a high electrical insulation capability. From this a multiplicity of advantages can result from the use of a compound from the group of fluorinated ketones as a constituent of a filling medium, or as a filling medium, for the filling of an enclosure, in which at least one voltaged component of a switching device for medium, high or extremely high voltage is enclosed.

Thus there exists, for example, the possibility of designing particularly compact switching devices for medium, high or extremely high voltage that are not dependent on the use of SF6. Switches and switchgear for medium, high or extremely high voltage can be cited as examples. The abandonment of SF6 can, as already elucidated, bring with it the advantage of significantly improved environmental compatibility of switching devices of this type. On the other hand it is not necessarily the case that the enclosure in which the at least one voltaged component of the switching device for medium, high, or extremely high voltage is enclosed must be designed especially for filling with a filling medium according to the invention, instead it can also be, for example, an enclosure that was designed for filling with SF6 as a filling medium, but which is filled with a filling medium according to the invention. The migration across to the use of a filling medium according to the invention can be eased in this manner.

Moreover compounds from the group of fluorinated ketones can be suitable for extinguishing switching arcs, or also fault arcs, in switching devices for medium, high, or extremely high voltage promptly after their appearance. By this means the reliability of such switching devices can be increased. Moreover the use of further extinguishing devices, such as extinguishing coils, for example, can be unnecessary. This in turn can lead to reduced production costs, and at the same time can reduce the space requirement of switching devices for medium, high, and extremely high voltage. Also by the use of a compound from the group of fluorinated ketones as a constituent of a filling medium, or as a filling medium, for the filling of an enclosure in which at least one voltaged component of a switch for medium, high, or extremely high voltage is enclosed, the requirements on the related switch drive can be downgraded. Thus the arc extinguishing properties of the filling medium can, for example, render superfluous a particularly rapid separation of contacts that was previously necessary during the opening of a switch for medium, high, or extremely high voltage. By this means the possibility of using more cost effective and more compact switch drives can ensue.

The filling medium can thus be used to serve as an electrical insulation medium and/or an arc extinguishing medium.

To cite just one further possible advantage, switching devices for medium, high or extremely high voltage, in which at least one voltaged component of the switching device is enclosed in an enclosure and the enclosure is filled with a filling medium that contains at least one compound from the group of fluorinated ketones, or consists of the same, can be particularly suitable for operation under extreme climatic conditions. They can also then be used outside climatically-controlled buildings. Moreover filling media of this type can exist as a liquid under normal conditions. This can ease storage and transport. The freezing point of $CF_3CF_2C(O)CF(CF_3)_2$, for example, is −108° C. The critical temperature of $CF_3CF_2C(O)CF(CF_3)_2$, on the other hand, is +168.7° C. Under normal conditions $CF_3CF_2C(O)CF(CF_3)_2$ therefore exists as a liquid.

A filling medium that contains at least one compound from the group of fluorinated ketones, or consists of the same, can moreover have the advantage that it is very largely non-injurious to health. This improves safety levels when working with the filling medium, for example during production, installation or maintenance of a switching device according to the invention, or during operation of the same. For $CF_3CF_2C(O)CF(CF_3)_2$, for example, the property of being non-injurious to health is very largely fulfilled. This is also true after any dispersal into the air.

Furthermore a filling medium that contains at least one compound from the group of fluorinated ketones, or consists of the same, can be odourless, which makes it pleasant to work with.

Moreover a filling medium that contains at least one compound from the group of fluorinated ketones, or consists of the same, can have a low viscosity, which eases the filling of an enclosure with the filling medium, in particular by means of automatic pumps. $CF3OF2C(O)CF(CF3)2$, for example, has a viscosity of $3.9 \times 10^{-8}$ m2/s at 25° C.

A filling medium that contains at least one compound from the group of fluorinated ketones, or consists of the same, can moreover be colourless and can disperse from objects with which it comes into contact without leaving any residues.

Examples of embodiment of the present invention envisage that the switching device is designed as a switching device for medium voltage. The use of a compound from the group of fluorinated ketones as a constituent of a filling medium, or as a filling medium, for the filling of an enclosure in which at least one voltaged component of a medium voltage switching device is enclosed, can bring with it the advantage that in comparison to regions of higher voltage in the region of medium voltage, i.e. in the voltage range from 1 kV to 52 kV, a filling medium according to the invention can extinguish an arc with a particularly high probability, and an electrical insulation action can be ensured by the filling medium in a particularly reliable manner.

In accordance with an exemplary form of embodiment of the invention the switching device according to the invention is designed as a switch with at least two contact means enclosed in the enclosure. The contact means can be of different designs. Thus configuration of the contact means as switching tubes that can be connected electrically via a switching contact is just as feasible as implementation as a pair of contact pieces that can be directly connected together electrically. In the exemplary forms of embodiment here elucidated it can be advantageous if the contact means are directly surrounded by the filling medium by means of the arrangement of the two contact means in the enclosure. The filling medium can then insulate the contact means in the outwards direction, in other words, it can act as an electrical insulation medium. Furthermore it can extinguish promptly arcs that can occur during the electrical separation or connection of the contact means, and can thus support reliable operation of the switch, and thus also of an electrical device in which it is installed. The rapid extinction of arcs can moreover contribute to reduced wear of switch components and thus can increase their service life.

The switch can also have more than two contact means; it can, for example, be designed as a three-position switch with three contact means enclosed in the enclosure.

Further examples of embodiment of the invention envisage that the switching device is designed as switchgear. A large number of voltaged components are often present in switchgear; these must be insulated relative to other parts. Examples of such components include busbars, cable connectors, or switches. Likewise switching arcs or fault arcs can occur in the switchgear; these must be extinguished as soon as possible after they appear. The filling medium can undertake these tasks. Here it is possible that the switchgear includes a plurality of separate enclosures, which in each case are filled with a filling medium, which contains at least one compound from the group of fluorinated ketones, or consists of the same. All enclosures can be filled with the same filling medium, or the filling media can differ. In accordance with other variants the overall housing of the switchgear can be filled with the filling medium such that the housing forms an enclosure in accordance with the invention.

In accordance with exemplary examples of embodiment of the invention the switching device for medium, high, or extremely high voltage is designed as switchgear that includes at least one switch for medium, high, or extremely high voltage arranged in the enclosure. Thus the switches arranged in the enclosure can be electrically insulated relative to other parts of the switchgear by means of the filling medium in the enclosure. In accordance with this example of embodiment of the invention both a plurality of switches for medium, high, or extremely high voltage of the switchgear can be arranged in the enclosure, as can also just a single switch. Likewise different enclosures can be included in the switchgear, in each of which at least one switch for medium, high, or extremely high voltage is arranged. A filling medium according to the invention can by virtue of a good electrical insulation action increase the operational reliability of the switchgear and at the same time open up the possibility of particularly compact forms of design. Since a filling medium according to the invention can be designed to have a strong arc extinguishing action, in accordance with the example of embodiment any fault arcs occurring within the enclosure filled with the filling medium can be extinguished rapidly. This can be beneficial for the operational reliability of the switchgear, and can also increase its service life and reduce maintenance requirements.

Exemplary forms of embodiment of the invention envisage that the switching device for medium, high, or extremely high voltage is designed as switchgear that includes at least one switch for medium, high, or extremely high voltage arranged in the enclosure, wherein this switch in turn is itself a switching device for medium, high, or extremely high voltage. At least two contact means of the switch are enclosed in the enclosure of the switch, wherein the enclosure is filled with a filling medium, which contains at least one compound from the group of fluorinated ketones, or consists of the same. In examples of embodiment of the invention switchgear for medium, high or extremely high voltage can accordingly have an enclosure that is configured, for example, as a switching chamber and is filled with a filling medium, which contains at least one compound from the group of fluorinated ketones, or consists of the same. Within this enclosure is arranged at least one switch for medium, high or extremely high voltage, whose at least two contact means are enclosed in a further enclosure, which likewise is filled with a filling medium, which contains at least one compound from the group of fluorinated ketones, or consists of the same. Here the filling media of the enclosure of the switchgear, such as e.g. the switching chamber, and the filling media of the enclosure of the contact means of the switch, need not necessarily have the same composition.

One advantage of these examples of embodiment can be seen in the fact that a particularly good electrical insulation action and a particularly good arc extinguishing action of the filling medium or filling media can make itself felt both in the enclosure of the switchgear and also in the enclosure of the contact means. The advantages of a filling medium that contains at least one compound form the group of fluorinated ketones, or consists of the same, can then be exploited in two respects, and can thus manifest themselves to a particularly significant extent.

Other exemplary forms of embodiment of the invention include the feature that the switching device for medium, high, or extremely high voltage is designed as switchgear that includes at least one switch for medium, high, or extremely high voltage arranged in the enclosure, wherein the switch arranged in the enclosure includes at least two contact means, which are surrounded by the filling medium of the enclosure of the switchgear. Accordingly switchgear for medium, high or extremely high voltage can have an enclosure that is configured, for example, as a switching chamber and is filled with a filling medium, which contains at least one compound from the group of fluorinated ketones, or consists of the same. Within this enclosure is arranged at least one switch for medium, high or extremely high voltage. In contrast to the example of embodiment elucidated immediately above, however, its at least two contact means are not enclosed a second time within the zone bounded by the enclosure of the switchgear, thus e.g. within a switching chamber. Thus the filling medium of the enclosure of the switchgear can also surround the contacts of a switch arranged within this enclosure. Since a filling medium that contains at least one compound from the group of fluorinated ketones, or consists of the same, can be equally suitable for extinguishing switching arcs of a switch for medium, high, or extremely high voltage very soon after they appear, and can also effectively counteract fault arcs, and at the same time can provide excellent electrical insulation, any separate enclosure of the contact means can be dispensed with. By this means the production resource and the space requirement for the switchgear can be further reduced.

In accordance with some forms of embodiment of the invention the switchgear can be designed as block switchgear that contains more than one switch. In particular if the contact means of the switches are enclosed in a common enclosure with a filling medium that contains at least one compound from the group of fluorinated ketones, or consists of the same; if, for example; the contact means are also surrounded by the filling medium of the enclosure of the switchgear, a particularly compact design for the block switchgear can be possible.

Examples of embodiment of the invention envisage that the enclosure of the switching device is provided with a closure element that can be opened and again closed. The closure element can, for example, be configured as a flap valve, which is attached to the enclosure, and features locking means and also sealing means. If the switching device, for example, exists as switchgear for medium, high or extremely high voltage, the possibility exists of obtaining access by virtue of the closure element to the parts enclosed in the enclosure of the switchgear for maintenance purposes. A filling medium that contains at least one compound from the group of fluorinated ketones, or consists of the same, can under normal conditions exist as a liquid. By this means the filling medium can be released from the enclosure during maintenance and collected in a container in a simple manner, and after maintenance is complete can be refilled into the enclosure of the switchgear. Thus a reduction in consumption of the filling medium and thus also a cost saving can be made possible.

The invention is elucidated in more detail in what follows with the aid of three figures.

DETAILED DESCRIPTION OF THE INVENTION

Figure 1:
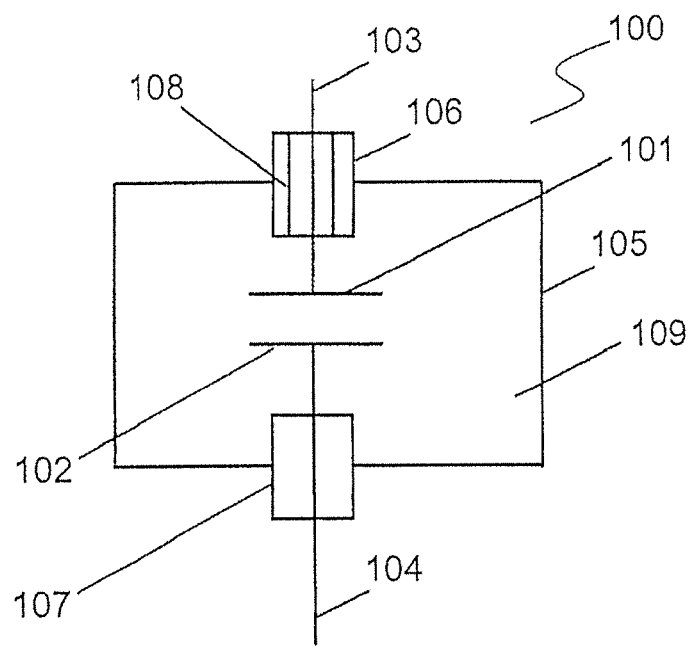
FIG. 1 shows a schematic representation of a switch for medium, high, or extremely high voltage in accordance with a first example of embodiment of the invention.

FIG. 1 shows a schematic representation of a switch 100 for medium, high, or extremely high voltage, that is to say a switching device for medium, high, or extremely high voltage, in accordance with a first example of embodiment of the invention. The switch 100 includes two contact means designed as contact pieces 101 and 102. These are enclosed in an enclosure 105. Contact with them can be made via the connecting pieces 103 and 104. The connecting pieces 103 and 104 are led outwards through ceramic insulators 106 and 107. To name just one further possibility, cast resin insulators can also be used. Contact piece 101 and connecting piece 103 are configured such that they can move, so that the contact pieces 101 and 102 can be connected together or separated electrically. To this end the connecting piece 103 is surrounded by a bellows 108, which is led through the ceramic insulator 106. The connecting piece 103 can be connected with a switch drive. In the enclosure 105 of the switch 100 voltaged components of the switch 100 are enclosed with the contact pieces 101 and 102, as are the corresponding sections of the connecting pieces 103 and 104. The enclosure 105 is filled with a filling medium 109, which consists of a compound from the group of fluorinated ketones. The present example features $CF_3CF_2C(O)CF(CF_3)_2$ as the filling medium 109; this is a perfluorinated ketone C-6.

The filling medium 109 is distinguished by the property that it electrically insulates the voltaged components 101-104 of the switch 100 from the enclosure 105 and from the surrounding environment. Here the electrical insulation action is comparatively strongly pronounced, so that work can be undertaken with a smaller volume of the filling medium. This allows a compact construction for the switch 100. Furthermore the filling medium 109 has the property of rapidly extinguishing arcs that can arise during switching processes between the contact pieces 101 and 102, which is advantageous as far as the operational reliability and service life of the switch 100 are concerned. In contrast to the widely-used medium SF6 it is climatically friendly. Moreover it is non-poisonous and can therefore be handled without harm.

A three-position switch with three contact means enclosed in the enclosure 105 can be constructed in a similar manner.

Figure 2:
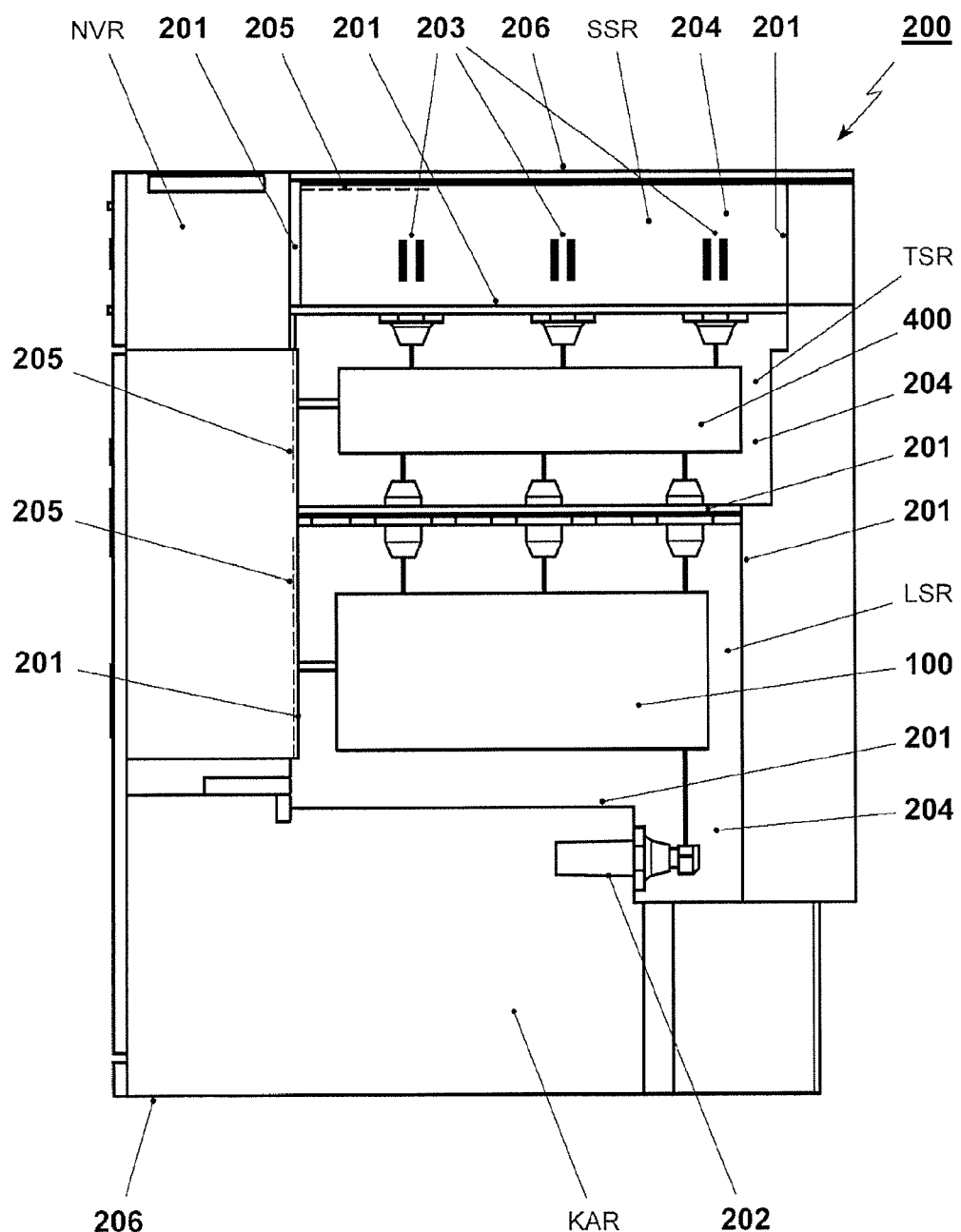
FIG. 2 shows a schematic representation of a medium voltage switchgear in accordance with a second example of embodiment of the invention, which includes a switch in accordance with the first example of embodiment of the invention.

FIG. 2 shows a schematic representation of a medium voltage switchgear 200 in accordance with a second example of embodiment of the invention, which includes a switch 100 in accordance with the first example of embodiment of the invention.

The medium voltage switchgear 200 is divided into various zones by means of bulkheads 201 and the housing 206. In the interests of clarity only some of these bulkheads are provided with a reference symbol. The switchgear 200 includes a low voltage zone NVR, a busbar zone SSR, a circuit breaker zone TSR, a power switch zone LSR and a cable connection zone KAR. The bulkheads 201 form enclosures of the low voltage zone NVR, the busbar zone SSR, the circuit breaker zone TSR, the power switch zone LSR and the cable connection zone KAR. The enclosures of the zones SSR, TSR and LSR of the medium voltage switchgear 200 are each provided with a closure element 205 that can be opened and again closed. The power switch zone LSR contains a voltaged component in the form of the power switch 100. Likewise voltaged components are arranged in the cable connection zone KAR in the form of the connecting parts 202. The busbar 203 of the busbar zone SSR is likewise a voltaged component. The zone TSR likewise contains a voltaged component in the form of a disconnector and earthing switch 400, which is designed as a three-position switch. Thus voltaged components are enclosed in the enclosures of the zones LSR, KAR, SSR and TSR formed by the bulkheads 201 and the housing 206. In particular the medium voltage switchgear 200 includes, in the form of the power switch 100 and the circuit breaker 400, switches arranged for medium voltage, each in an enclosure. The enclosures that bound the zones LSR, TSR and SSR, are in each case filled with a filling medium 204 that consists of a compound from the group of fluorinated ketones. In this example the filling medium 204 is selected to be the same CF3CF2C(O)CF(CF3)2 in all of the zones LSR, TSR and SSR. Thus in production only one filling medium needs to be held in stock. The enclosures are configured by means of appropriate design of the bulkheads 201 and the housing 206 such that the filling medium cannot escape from them. It is however also possible to insulate the busbar zone SSR in a manner other than by filling it with a filling medium according to the invention. Thus, for example, a solid can be used, as can air.

The use of CF3CF2C(O)CF(CF3)2 as a filling medium 204 ensures good insulation of the voltaged components 100, 400 and 203. At the same time the filling medium is suitable for rapid extinction of the fault arcs that can occur within the zones LSR, TSR and SSR; this can increase the operational reliability and also the service life of the medium voltage switchgear 200. The enclosures of the zones LSR, TSR and SSR also ensure that an arc occurring in one of these zones cannot encroach into the other zones. In comparison to SF6 the filling medium 204 is less harmful to the climate.

The power switch 100 is constructed in accordance with the example of embodiment corresponding to the example of embodiment shown in FIG. 1. The power switch 100 therefore represents a switching device according to the invention that features its own enclosure. At the same time the power switch 100 is enclosed in the enclosure, formed by the bulkheads 201, of the power switch zone LSR of the medium voltage switchgear 200, which as such itself likewise represents a switching device according to the invention. Here, for example, the filling media 204 of the enclosures of the medium voltage switchgear 200, and the filling medium 109 of the enclosure 105 with the contact means 101 and 102 (only shown in FIG. 1) of the power switch 100, need not necessarily have the same composition.

The use of the power switch 100, which is itself a switching device according to the invention, as a constituent of the medium voltage switchgear 200, which likewise is a switching device according to the invention, offers the advantage that a particularly good electrical insulation action and a particularly good arc extinguishing action of the filling medium CF3CF2C(O)CF(CF3)2 can make itself felt both in the enclosure of the power switch zone LSR of the medium voltage switchgear 200 and also in the enclosure 105 of the contact means 101, 102. The advantages of the filling medium CF3CF2C(O)CF(CF3)2 can then be exploited in two respects and can thus manifest themselves to a particularly significant extent.

Instead of the power switch 100 used in the example of embodiment other power switches, such as, e.g. vacuum switches, can also be used. Alternatively it is also possible not to encapsulate separately the contact means of the power switch as constructed, so that the contact means of the power switch are also surrounded by the filling medium 204 of the enclosure formed by the bulkheads 201, which bounds the power switch zone LSR of the medium voltage switchgear 200. Since the filling medium 204 can be suitable for extinguishing switching arcs of the power switch very soon after they arise, likewise for effectively counteracting fault arcs, and also for providing excellent electrical insulation, a separate enclosure of the contact means can be dispensed with. By this means the production resource and space requirement for the medium voltage switchgear 200 can possibly be further reduced.

The closure element 205 that can be opened and again closed, for example, of the enclosure of the power switch zone LSR of the medium voltage switchgear 200, is configured as a flap valve and features locking means (not shown) and also sealing means (not shown). The closure element 205 allows access to be gained to the power switch 100 for maintenance purposes. The filling medium exists as a liquid under normal conditions. By this means the filling medium 204 can according to the example of embodiment be released during maintenance from the enclosure that bounds the power switch zone LSR, collected in a container in a simple manner, and after maintenance is complete can be refilled into the enclosure. Thus a reduction in consumption of the filling medium 204, and thus also a cost saving, are possible.

Figure 3:
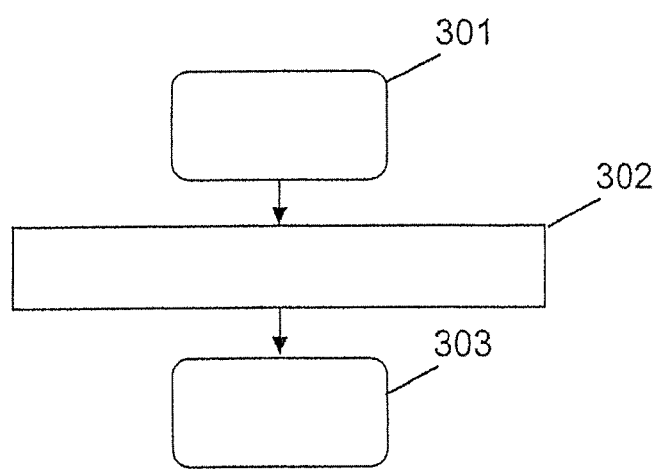
FIG. 3 shows a flow diagram that illustrates the sequence of a method according to the invention.

FIG. 3 shows a flow diagram that illustrates in an exemplary manner the sequence of a method according to the invention.

Step 301 is the starting point. Step 302 comprises the filling of an enclosure, in each at least one voltaged component of a switching device for medium, high, or extremely high voltage is enclosed, with a filling medium. The filling medium contains at least one compound from the group of fluorinated ketones, or consists of the same. The method ends in step 303.

What is claimed is:

1. An electrical insulation medium, comprising at least one of the following compounds:
   (a) a fluorinated ketone selected from a group of fluorinated ketones C4-C8 with the general formula R—C(0)-R', wherein R and R' are partially fluorinated or perfluorinated substituents, or
   (b) a fluorinated ketone selected from a group of fluorinated ketones C5-C7, C9, C10, C11, C13, C14, C15.

2. The electrical insulation medium according to claim 1, wherein the compound from the groups of fluorinated ketones is C13.

3. The electrical insulation medium according to claim 1, wherein the compound from the groups of fluorinated ketones is C14.

4. The electrical insulation medium according to claim 1, wherein the compound from the groups of fluorinated ketones is C15.

5. The electrical insulation medium according to claim 1, wherein the compound from the groups of fluorinated ketones is C5.

6. The electrical insulation medium according to claim 1, wherein the compound from the groups of fluorinated ketones is C7.

7. The electrical insulation medium according to claim 1, wherein the compound from the groups of fluorinated ketones is selected from the group consisting of $CF_3C(O)CF(CF_3)_2$, $CH_3C(O)CF_2CF_2H$, and $CH_3C(O)CF_2CFHCF_3$.

8. The electrical insulation medium according to claim 1, wherein the fluorinated ketone is alpha-branched to the carbonyl group.

9. The electrical insulation medium according to claim 1, wherein the compound from the groups of fluorinated ketones comprises at least one constituent that contains one or more non-chain forming heteroatoms interrupting the main carbon chain in a perfluorinated part of the molecule.

10. The electrical insulation medium according to claim 9, wherein the heteroatom is a nitrogen, oxygen or sulphur atom.

11. The electrical insulation medium according to claim 9, wherein the compound is a perfluoroketone.

12. A filling medium for a switching device or a switchgear for medium, high or extremely high voltage, comprising an electrical insulation medium according to claim 1.

13. The filling medium according to claim 12, further comprising at least one further component not belonging to the groups of fluorinated ketones.

14. The filling medium according to claim 12, wherein the filling medium consists of the electrical insulation medium.

15. A switching device for medium, high or extremely high voltage, wherein at least one voltaged component of the switching device is enclosed in an enclosure and the enclosure is filled with a filling medium according to claim 12.

16. A switchgear for medium, high or extremely high voltage, wherein at least one voltaged component of the switchgear is enclosed in an enclosure and the enclosure is filled with a filling medium according to claim 12.

17. The switchgear according to claim 16, wherein the component comprises at least one of a busbar, a cable connector and a switch.

18. A switchgear for medium, high or extremely high voltage, wherein at least one switch is enclosed in a switching chamber, wherein at least two contact means of said switch are enclosed in an enclosure, wherein the switching chamber and the enclosure are filled with a filling medium according to claim 12.

19. The switchgear according to claim 18, wherein the filling media of the switching chamber and the enclosure have the same composition.

20. The switchgear according to claim 18, wherein the filling media of the switching chamber and the enclosure have a different composition.

21. A switching device for medium, high or extremely high voltage, wherein at least one voltaged component of the switching device is enclosed in an enclosure and the enclosure is filled with a filling medium according to claim 12, wherein the enclosure comprises a closure element that can be opened and again closed.

22. The switching device of claim 21, wherein the closure element is a flap valve.

23. The switching device of claim 21, wherein the flap valve has locking means and sealing means.

24. The switching device of claim 21, wherein the closure element provides access to the parts of the switching device which are enclosed in the enclosure.

25. The switching device of claim 21, wherein the closure element allows filling the filling medium into the enclosure and removing the filling medium from the enclosure.

26. A switching device for medium, high or extremely high voltage, wherein at least two contact means of the switching device are enclosed in an enclosure and the enclosure is filled with a filling medium according to claim 12.

27. The switching device of claim 26, wherein the at least two contact means are of different designs.

28. The switching device of claim 26, wherein the at least two contact means are switching tubes that can be connected electrically via a switching contact.

29. The switching device of claim 26, wherein the at least two contact means are two contact pieces that can be directly connected together electrically.

30. The switching device of claim 26, wherein the switching device is a three-position switch with three contact means enclosed in the enclosure.

31. The switching device of claim 26, wherein the switching device is a switchgear comprising at least two voltaged components which are electrically insulated with respect to each other.

32. The switching device of claim 31, wherein the voltaged components include a busbar, a cable connector, or a switch.

33. The switching device of claim 31, wherein the switchgear includes a plurality of separate enclosures, each being filled with a filling medium, wherein the filling medium comprises an electrical insulation medium comprising at least one compound from the group of fluorinated ketones.

34. The switching device of claim 33, wherein the filling medium is the same for all enclosures.

35. The switching device of claim 33, wherein the filling medium differs between enclosures.

36. The switching device according to claim 31, wherein the switchgear is a block switchgear containing more than one switch.

37. The electrical insulation medium according to claim 10, wherein the compound is a perfluoroketone.

38. The electrical insulation medium according to claim 1, wherein the compound is disposed around at least one electrically conducting component.

* * * * *